(12) United States Patent
Alexandrov et al.

(10) Patent No.: US 8,520,821 B2
(45) Date of Patent: *Aug. 27, 2013

(54) SYSTEMS AND METHODS FOR SWITCHING BETWEEN COMPUTER AND PRESENTER AUDIO TRANSMISSION DURING CONFERENCE CALL

(75) Inventors: Albert Alexandrov, Goleta, CA (US); Florian Winterstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 729 days.

This patent is subject to a terminal disclaimer.

(21) Appl. No.: 12/509,230

(22) Filed: Jul. 24, 2009

(65) Prior Publication Data

US 2011/0019810 A1    Jan. 27, 2011

(51) Int. Cl.
*H04M 3/56* (2006.01)
*H04M 9/08* (2006.01)
*H04L 12/18* (2006.01)

(52) U.S. Cl.
USPC . 379/202.01; 370/268; 370/269; 379/406.01; 455/416

(58) Field of Classification Search
USPC .............. 370/260–270; 379/202.01–206.01, 379/406.01; 455/416
See application file for complete search history.

(56) References Cited

U.S. PATENT DOCUMENTS

| 8,223,943 | B2 * | 7/2012 | Alexandrov et al. | ..... 379/202.01 |
| 2005/0094580 | A1 | 5/2005 | Kumar et al. | |
| 2006/0247045 | A1 * | 11/2006 | Jeong et al. | ..................... 463/35 |
| 2008/0084981 | A1 * | 4/2008 | Lee et al. | ................. 379/201.01 |
| 2010/0262267 | A1 * | 10/2010 | Alexandrov et al. | ........... 700/94 |

FOREIGN PATENT DOCUMENTS

WO    WO2006/116644 A2    11/2006
WO    WO2008/036950 A2    3/2008

OTHER PUBLICATIONS

The International Search Report and Written Opinion from corresponding PCT Application No. PCT/US2010/042320 dated Nov. 29, 2010.

* cited by examiner

*Primary Examiner* — Harry Hong
(74) *Attorney, Agent, or Firm* — McDermott Will & Emery LLP (57) ABSTRACT

A new approach is proposed that contemplates systems and methods to support switching between computer audio and presenter audio during a conference call so that one and only one, not both, of the two audio streams is being transmitted to the rest of the conference at any time. More specifically, a switch engine is adopted, which separately takes one or more audio streams captured by a sound mixing component of the hosting device of a presenter and by a microphone attached to the hosting device as its two inputs, and outputs only one of the two inputs at any time. The selected audio output is then processed and transmitted to the rest of the conference with feedback from other audio sources canceled.

42 Claims, 10 Drawing Sheets

SYSTEMS AND METHODS FOR SWITCHING BETWEEN COMPUTER AND PRESENTER AUDIO TRANSMISSION DURING CONFERENCE CALL

RELATED APPLICATIONS

This application is related to U.S. patent application Ser. No. 12/423,467 filed Apr. 14, 2009, and entitled "System and methods for computer and voice conference audio transmission during conference call via PSTN phone," by Albert Alexandrov and Florian Winterstein, which is hereby incorporated herein by reference.

This application is related to U.S. patent application Ser. No. 12/423,451 filed Apr. 14, 2009 and entitled "System and methods for computer and voice conference audio transmission during conference call via VoIP Device," by Albert Alexandrov and Florian Winterstein, which is hereby incorporated herein by reference.

BACKGROUND

A conference call is a telephone call between two or more callers or users (referred to herein as a group of participants) at geographically distributed locations, which allows each participant to be able to speak to, and listen to, other participant(s) simultaneously. A conference call among a plurality of participants can be conducted via a voice conference bridge or centralized server, which connects numerous endpoint devices (VoIP devices or PSTN telephones) associated with the participants using appropriate communication protocols and mixes the various incoming voice streams from the plurality of participants either at the endpoint devices or at the conference bridge.

A Web conferencing tool enables the group of participants to organize and attend meetings online during a conference call by allowing a presenter in the group of the participants at the conference call to run a computer software application (also referred to herein as the application) or to present a material via a hosting device and share the application or material with the rest of the group (the viewers) to view in real time. For non-limiting examples, such Web conferencing tool enables the presenter to perform live demonstrations in real time, collaborate documents with colleagues, and provide training to customers and employees.

During the Web conferencing, an outgoing audio stream (or audio) of the material being presented and/or the application being run via the hosting device of the presenter (also referred to herein as the computer audio stream) may often need to be transmitted to the conference in addition to, and in separation from, an outgoing voice conference audio stream of the presenter or viewer speaking at the conference call (also referred to herein as the presenter or viewer audio stream, respectively). In the meantime, an incoming voice audio stream needs to be received from the rest of the group speaking at the conference call (also referred to herein as the voice conference audio stream). When there are more than one person who need to listen to and/or to speak at the conference call at the same location as the presenter or the viewer, the presenter or viewer may have to "open up" the conference call by using a separate speaker and a microphone associated with the hosting device to allow other people at the location to listen to the conference. Consequently, the computer audio stream and the conference audio stream played back through the speakers may get (partly) picked up by the microphone together with the presenter or viewer audio stream, causing deterioration in the audio quality of the conference call. Conversely, it is important to make sure that the two outgoing audio streams, the computer audio stream and the presenter audio stream, are transmitted "cleanly" by the hosting device without interfering with one another. Although some echo "canceling" or "cancellation" approaches target at suppressing and removing from one audio stream the echo, noise, and feedback of another, such approaches require capturing both of the audio streams independently at the same time, which is not always feasible due to hardware/software/OS limitations of the hosting device.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support switching between computer audio and presenter audio during a conference call so that one and only one, not both, of the two audio streams is being transmitted to the rest of the conference at any time. More specifically, a switch engine is adopted, which separately takes one or more audio streams captured by a hosting device of a presenter and a microphone attached to the hosting device as its two audio inputs, and outputs only one of the two audio inputs to a voice audio engine of the hosting device at any time. The selected audio output is then processed and transmitted to the rest of the conference with feedback from other audio sources canceled. Such audio switching approach cuts off at least one of the feedback path(s) among multiple audio streams and requires only one of the computer audio and audio streams from the microphone to be captured. It enables "clean" transmission of either the computer audio stream or the presenter audio stream with any mixing of echoes or feedbacks from other sources canceled during the conference at which open speakers and microphones are used and/or multiple audio streams are possibly captured, leaked into, or mixed with one another. Here, cancellation means reducing the echo or noise with the "best effort", while certain residue of the echo and feedback may still remain in the resulting audio stream after such cancellation. Although only one of the computer audio stream and the presenter audio stream is being transmitted at any time during the conference call, it does not affect usability of the conference system for all practical purposes since presenters rarely need to speak and show a computer presentation/application with audio at the same time. Although a conference call involving two or more persons is used as a non-limiting example in the discussion of the proposed approach hereinafter, the same approach can also be applied to at least one of the following scenarios where a) there is only an one-on-one call/communication between a presenter and a viewer; b) the viewer may only listen to but is not allowed to speak during the communication; or c) where the viewer is absent (e.g., the presenter is making a solo sound recording of his/her presentation and an audio-producing computer application).

Figure 1:
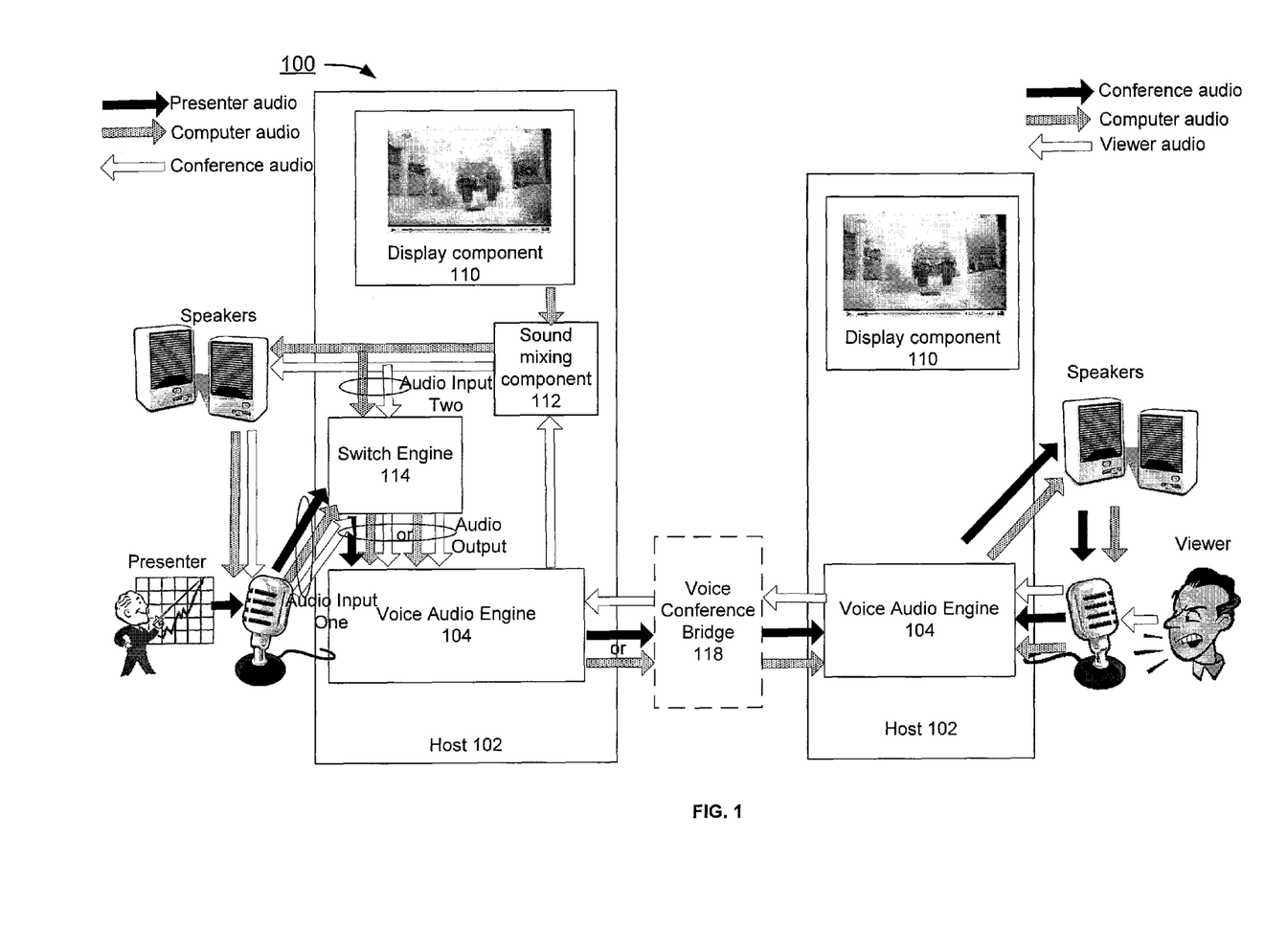
FIG. 1 depicts an example of a diagram of system to support switching between computer audio stream and presenter audio stream during a conference between a presenter and a viewer conferencing through their respective hosting devices.

FIG. 1 depicts an example of a diagram of system 100 to support switching between computer audio stream and presenter audio stream during a conference between a presenter and a viewer conferencing through their respective hosting devices. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes hosts (hosting devices) 102 deployed for each of a presenter and a viewer at a conference call, wherein various components running on each host 102 include at least a voice audio engine 104, an optional display component 110, as well as a sound mixing component 112 and a switch engine 114 on the host 102 associated with the presenter; and an optional voice conference bridge 118 running on a separate host.

As used herein, the term "engine", "component", or "bridge" refers to a software, firmware, hardware, or other component that is used to effectuate a purpose. The engine, component, or bridge will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, the host 102 can be a computing device, a communication device, a storage device, or any electronic device capable of running a software component. For non-limiting examples, a computing device can be but is not limited to, a laptop PC, a desktop PC, a tablet PC, an iPod, a PDA, or a server machine. A storage device can be but is not limited to a hard disk drive, a flash memory drive, or any portable storage device. A communication device can be but is not limited to a mobile phone.

In the example of FIG. 1, the voice audio engine 104 is a software subsystem for bidirectional communication of audio streams of data instead/in place of a (PSTN) telephone. The voice audio engine 104 is typically used as an embedded system on the host 102 using voice over internet protocol (VoIP) technology. The voice audio engine 104 can be an optimized software subsystems with mathematically complex signal processing required for voice filtering and speech coding as understood by one ordinarily skilled in the relevant art.

In the example of FIG. 1, the optional display component 110 enables the presenter to display, manipulate, and share an application he/she runs or a material he/she presents at the conference call and the viewer to hear or view the application run or material presented by the presenter. Here, the display component 110 can be a monitor, a screen, or any other displaying device associated with the host 102 known to one skilled in the art. The application or material can be any type of digital document, application, or program that produces sound and/or displayable on the display component 110 of the host 102, including the entire displayable desktop of the host 102.

In the example of FIG. 1, the sound mixing component 112 is a software component that utilizes one or more sound capturing devices of the host 102, such as a sound card of the host 102, a separate physical device of a microphone and/or a speaker, to capture and/or to playback audio streams by invoking Application Programming Interfaces (APIs) to the sound capturing devices, such as the operating system APIs. More specifically, the sound mixing component 112 mixes all audio streams that have been either originated or accepted by an application, program, or interface running on the host 102, such as the computer audio stream from the computer presentation/application and/or the conference audio stream received by the voice audio engine 104, and outputs the mixed audio streams to other components running on the host 102, such as the speakers and/or switch engine 114 discussed below via respective APIs.

In the example of FIG. 1, the switch engine 114 of the host 102 associated with the presenter captures audio streams from two sources as its inputs: Audio Input One from the microphone associated with the host 102, wherein Audio Input One includes the presenter audio as well as possible leak or feedback from one or more other audio streams such as a mix of computer audio stream and conference audio stream, wherein Audio Input Two from the sound mixing component 112 includes the mix of the computer audio stream and the conference audio stream. The switch engine 114 functions as a 2-to-1 switch, which only selects and outputs one of the two audio inputs to an audio switch component 202 of the switch engine 114 as its audio output to other component/engine running on the host 102, such as voice audio engine 104, at anytime upon an event or signal triggering the switch as shown in FIG. 2.

Figure 2:
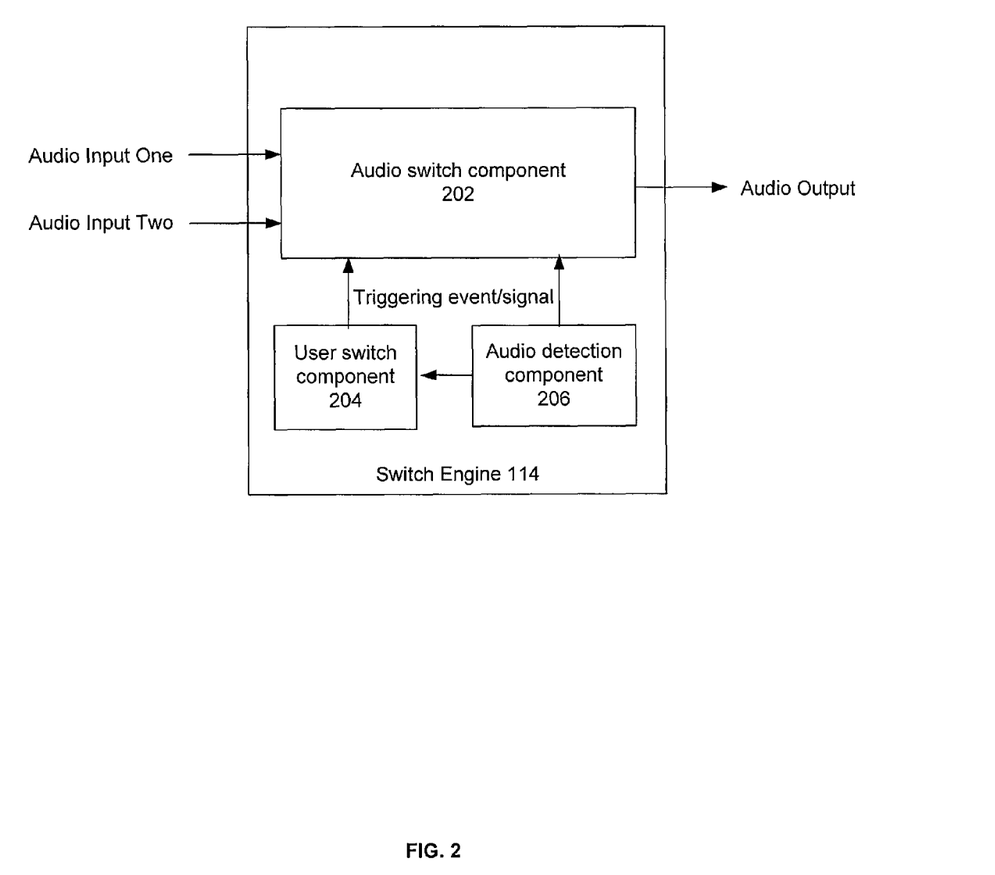
FIG. 2 illustrates an example of a configuration of the switch engine that includes at least one or more components to support one or more of switching modes.

FIG. 2 illustrates an example of a configuration of the switch engine 114 that includes at least one or more components to support one or more of the following switching modes:

Manual switching mode, where the user switch component 204 of the switch engine 114 presents the user (presenter) with options and enables the presenter to choose if he/she wants to share his/her own voice audio stream (the presenter audio stream) of Audio Input One or the audio stream from the presentation or application running on the host 102 (the computer audio stream) of Audio Input Two. The user switch component 204 then provides the choice of the presenter as a triggering signal to the audio switch component 202, which will then output the corresponding audio stream.

Automatic switching mode, where the audio detection component 206 of the switch engine 114 checks whether the presenter is talking under a presenter-dominant scenario, e.g., whether there is active presenter audio stream captured by the microphone. If so, the audio detection component 206 automatically sends a triggering signal to the audio switch component 202 to output the Audio Input One captured from the microphone instead of the computer audio stream of Audio Input Two. Once the presenter stops talking, the audio detection component 206 may send another triggering signal to the audio switch component 202 to output the computer audio stream of Audio Input Two instead. Here, the audio detection component 206 may check the presence of the presenter audio stream by, for a non-limiting example, by recording and monitoring the activity/volume of the Audio Input One captured from the microphone for a certain period of time, e.g., 20 milliseconds. If one second of active presenter audio stream is detected, the audio detection component 206 switches to Audio Input One captured from the microphone and plays back one second of recorded and buffered presenter audio stream. Alternatively, under a computer audio-dominant scenario, the audio detection component 206 checks whether an audio-producing computer presentation/application is actively running on the host 102. If so, the audio detection component 206 automatically sends a triggering signal to the audio switch component 202 to output the computer audio of Audio Input Two instead of the Audio Input One captured from the microphone. Once the presentation/application stops producing the sound, the audio detection component 206 may send another triggering signal to the audio switch component 202 to output the computer audio stream of Audio Input One captured from the microphone instead. Here, the audio detection component 206 may check the presence of the computer audio stream, for a non-limiting example, monitoring whether a media player actively running on the host 102, such as Windows Media Player or QuickTime or a YouTube video, starts playing back audio/video.

Semi-automatic switching, where the audio detection component 206 functions similarly to under the automatic switching mode. But instead of sending a triggering signal to the audio switch component 202 immediately upon detection of the presenter or computer audio stream, however, the audio detection component 206 sends an signal to the user switch component 204 to alert the presenter and/or ask the presenter whether he/she would like to make the switch from the computer audio stream to the presenter audio stream or vise versa via the user switch component 204.

In the example of FIG. 1, the optional voice conference bridge 118 is operable to provide conferencing services over a communication network by establishing a conference call among a group of participants including at least a presenter and one or more viewers, receiving and optionally processing audio streams generated by each of the group of participants, such as presenter and viewer audio and computer audio, and providing the audio streams to the rest of the group of participants. Here, each of the group of participants is able to both simultaneously speak to the rest of the participants and watch the application run or material presented on the display component 110 of the host 102 while listening to the voice audio or computer audio during the conference call. Here, each of the group of participants may represent a group of people gathering at the same geographical location, such as a conference room or office, where everyone in the group can listen to or speak to the conference call via a telephony endpoint device. Note that the voice conference bridge 118 is optional under the scenarios discussed above where only the presenter and the viewer communicate with each other directly over a network or when the viewer is absent.

In the example of FIG. 1, the hosts 102 and the voice conference bridge 118 can communicate and interact with each other via communication interfaces (not shown) following certain communication protocols, such as TCP/IP protocol, over a network (not shown). Here, the network can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

While the system 100 depicted in FIG. 1 is in operation, the first host 102 is associated with a presenter during a conference call, where the optional display component 110 of the first host enables the presenter to display, manipulate, and share an application or a presentation material, which can be but is not limited to, a video, a slide, a graph, a piece of data, and a document at a conference call. While the application is being run and/or the material is being presented, the sound mixing component 112 captures and mixes both the computer audio stream of the application or material being presented and the conference audio stream from the rest of the conference. The switch engine 114 captures as its audio inputs the one or more audio streams (e.g., presenter audio plus any potential feedback or leakage noise) from the microphone associated with the first host 102 as Audio Input One, and the mixed audio streams from the sound mixing component 112 as its Audio Input Two. The switch engine 114 then selects, based on user input or automatic detection, and outputs one and only one of the two audio inputs as its Audio Output to voice audio engine 104. During the conference call, the voice audio engine 104 running on the first host enables the presenter to listen to the conference call hosted by the voice conference bridge 118 via a speaker (so that other people at the same location can listen in) and speaks to the conference call via a microphone. More specifically, the voice audio engine 104 accepts the conference audio stream from the rest of the conference for the presenter to listen to, as well as provides a "clean" computer audio stream or presenter audio stream from the switch engine 114 to the voice conference bridge 118 with echo or feedbacks from other audio sources canceled. Correspondingly, the second host 102 is associated with a viewer during the conference call, where an optional display component 110 of the second host receives and displays the presentation material or application originated by the presenter to the viewer at the conference call. While the application is being run or the material is being presented to the viewer, a voice audio engine 104 running on the second host enables the viewer to listen to a conference audio stream (including the presenter audio stream) and/or the computer audio stream of the application being run or the material being presented by feeding the audio streams to the speakers, and optionally to speak a voice audio stream of him/herself at the conference call via a microphone associated with the second host 102. The voice audio engine 104 on the second host also transmits a clean outgoing viewer audio stream to the voice conference bridge 118 hosting the conference call with all other audio streams (e.g., echoes and noises leaked through the microphone) canceled. During the conference call, the voice conference bridge 118 accepts, transmits, and optionally processes the voice audio streams between the presenter and the viewer.

Figure 3:
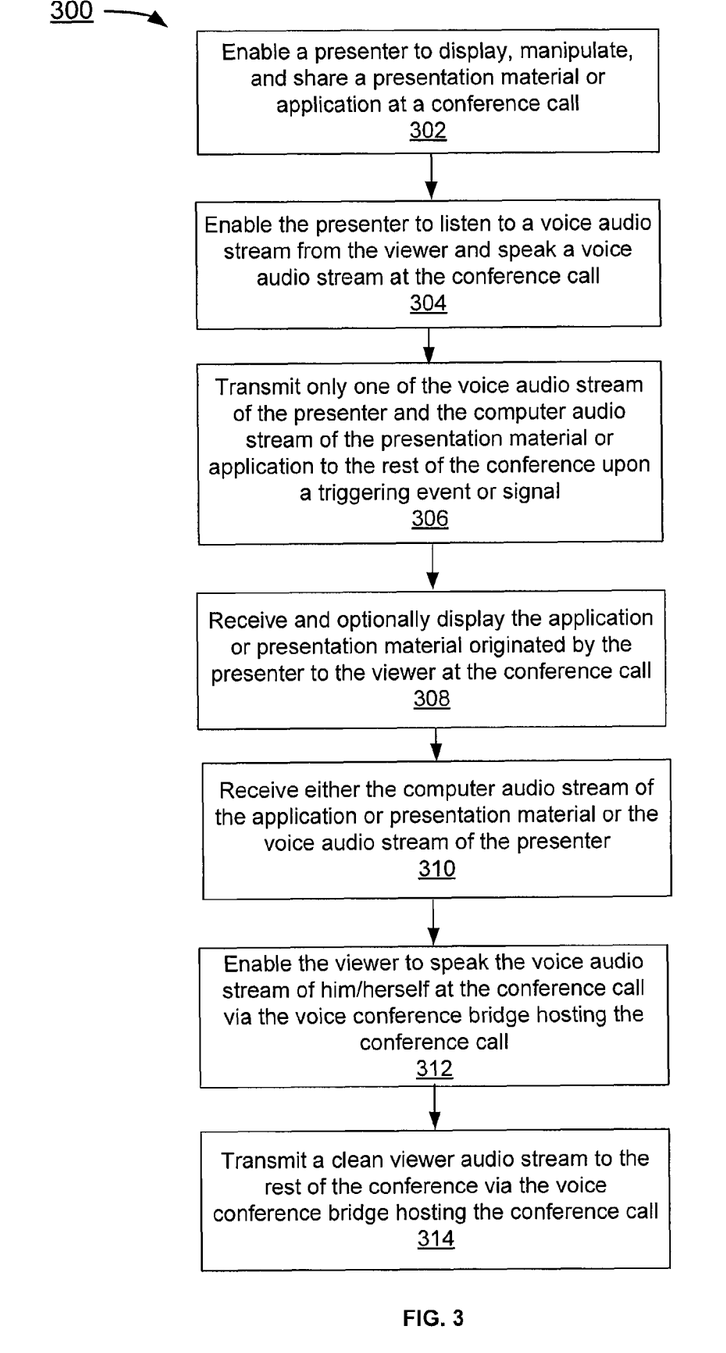
FIG. 3 depicts a flowchart of an example of a process to support switching between computer audio stream and presenter audio stream during a conference between a presenter and a viewer conferencing through their respective hosting devices.
Figure 4A:
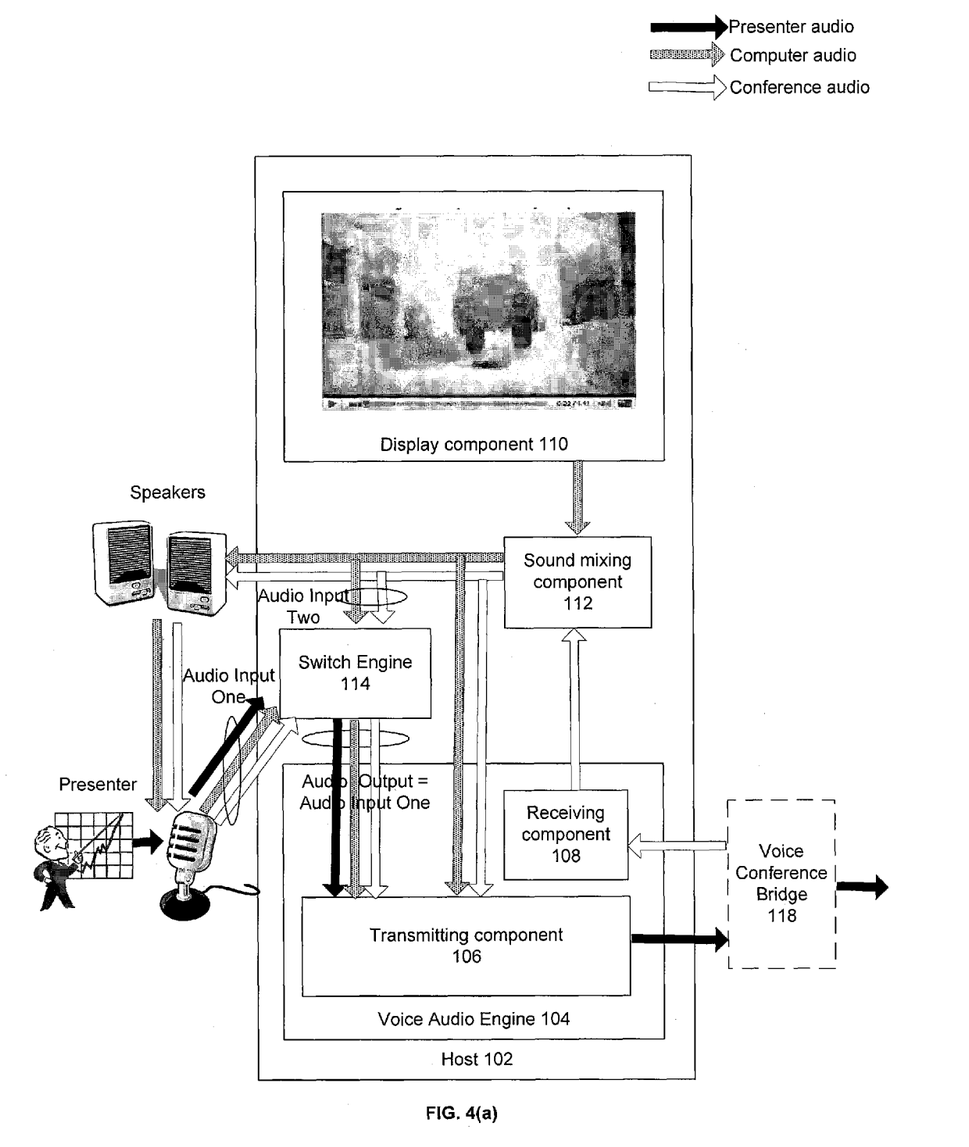
FIGS. 4(a)-(d) depict examples of diagrams of a system on the presenter side of FIG. 1 where the switch engine selects one of Audio Input One captured from the microphone associated with the presenter and Audio Two captured from sound mixing component as its Audio Output under one of the switching modes.
Figure 4B:
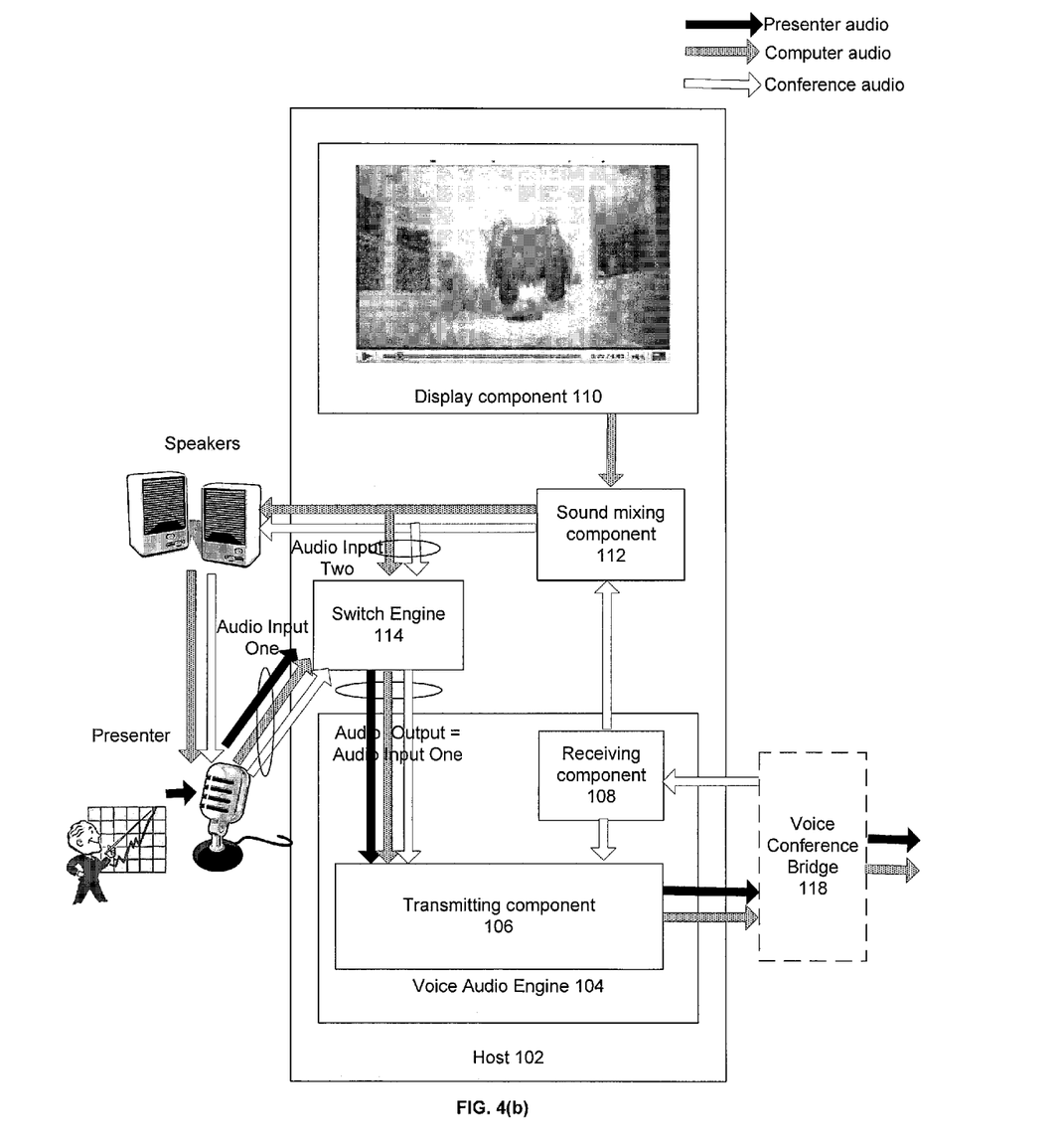
Figure 4C:
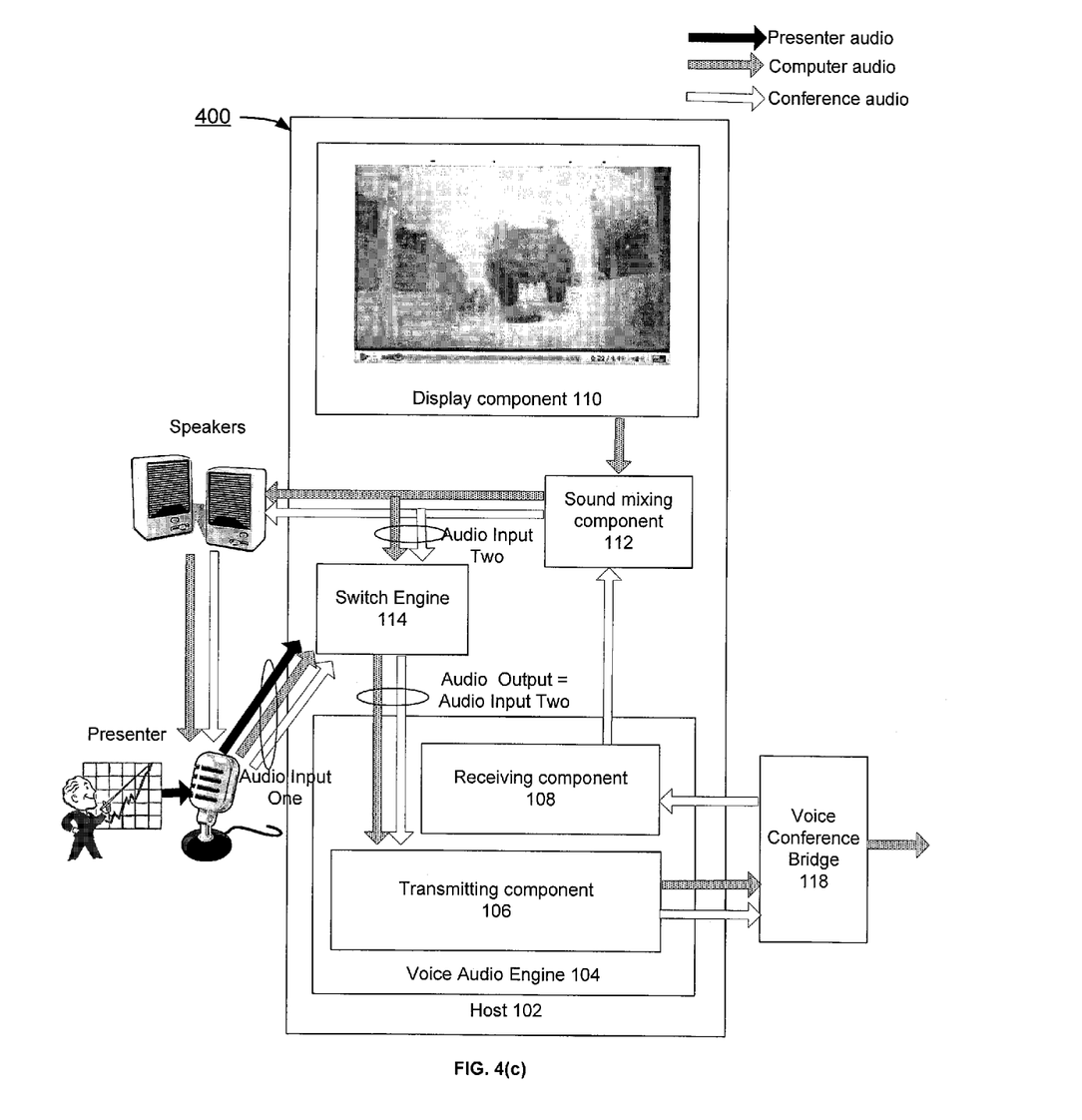
Figure 4D:
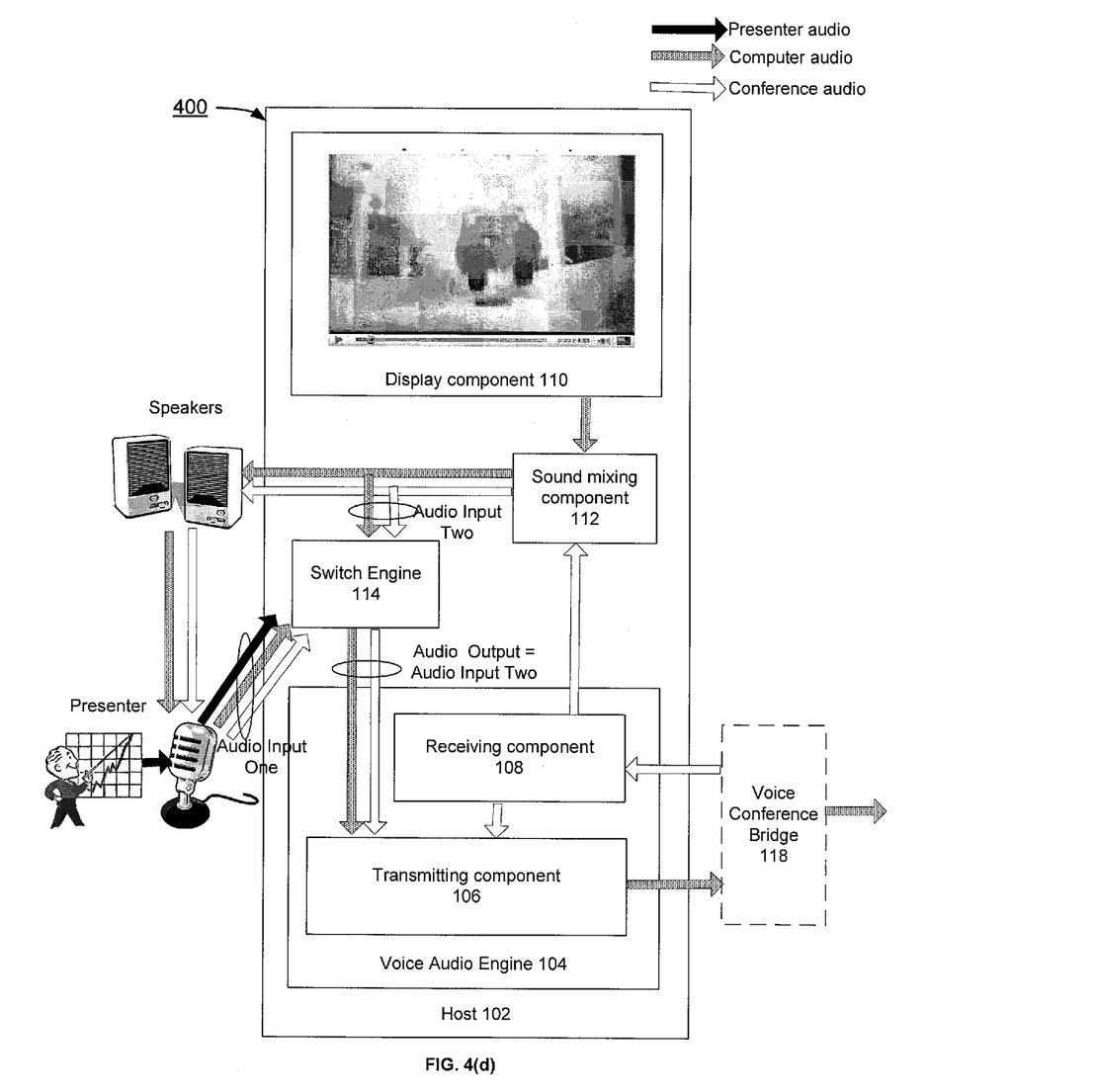

FIG. 3 depicts a flowchart of an example of a process to support switching between computer audio stream and presenter audio stream during a conference between a presenter and a viewer conferencing through their respective hosting devices. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where a presenter is enabled to display, manipulate, and share a presentation material or application at a conference call. The flowchart 300 continues to block 304 where the presenter is enabled to listen to a voice audio stream from a viewer and speak a voice audio stream of him/herself at the conference call. The flowchart 300 continues to block 306 where only one of the voice audio stream of the presenter and the computer audio stream of the presentation material or application is transmitted to the rest of the conference via a voice conference bridge hosting the conference call upon a triggering event or signal. The flowchart 300 continues to block 308 where the application or the presentation material originated by the presenter is received and optionally displayed to the viewer at the conference call. The flowchart 300 continues to block 310 where either the computer audio stream of the application or presentation material or the voice audio stream of the presenter is received by the viewer. The flowchart 300 continues to block 312 where the viewer is enabled to speak the voice audio stream of him/herself at the conference call. The flowchart 300 ends at block 314 where a clean viewer audio stream is transmitted to the rest of the conference via the voice conference bridge hosting the conference call.

VoIP Conferencing—Presenter Side

FIG. 4(*a*) depicts an example of a diagram of a system on the presenter side of FIG. 1 where the switch engine 114 chooses Audio Input One captured from the microphone associated with the presenter as its Audio Output under one of the switching modes discussed above. Although Audio Input Two from the sound mixing component 112 is being shut off by the switch engine 114, the mix of computer audio stream and conference audio stream is still output and played back via the speakers and leaked through the microphone. Consequently, both the presenter audio stream and the possible echo/leak of the mix of the computer audio stream and conference audio stream are captured by the microphone and provided to the switch engine 114 as Audio Input One. In the example of FIG. 4(*a*), the voice audio engine 104 further includes at least a transmitting component 106 and a receiving component 108. The transmitting component 106 of the voice audio engine 104 accepts (receives, collects, or captures) the presenter audio stream as well as the mix of the computer audio stream and conference audio stream from the Audio Output of switch engine 114. For a "clean" transmission of the presenter audio stream, the transmitting component 106 may further accept a mix of the computer audio stream and conference audio stream from the output of the sound mixing component, and then process to cancel the echo of the mix from the audio streams accepted from the switch engine 114 before transmitting the "clean" presenter audio stream to the voice conference bridge 118. Conversely, the receiving component 108 of the voice audio engine 104 accepts conference audio stream of the rest of the conference call from the voice conference bridge 118. It then processes and provides the conference audio stream to other components running on the host 102 such as the sound mixing component 112.

Alternatively, as shown in FIG. 4(*b*), the receiving component 108 of the voice audio engine 104 can provide the conference audio stream it received from the voice conference bridge 118 to the transmitting component 106 of the voice audio engine 104. The transmitting component 106 of the voice audio engine 104 then cancels the conference audio stream from the echo of the mix of the computer audio stream and conference audio stream received from the Audio Output of switch engine 114 together with the presenter audio stream, and transmits only the "cleaned" presenter audio stream (with some possible echo of the computer audio stream that has not been canceled) to the voice conference bridge 118, which then provides the presenter audio stream to the rest of the conference.

FIG. 4(*c*) depicts an example of a diagram of audio streams on the presenter side of FIG. 1 where the switch engine 114 chooses Audio Input Two captured from the sound mixing component 112 as its Audio Output under one of the switching modes discussed above. Although the mixed streams of the computer audio and the conference audio are also provided to the speakers and may feedback or leak through the microphone as part of the Audio Input One to the switch engine 114, such leakage will have no consequence since Audio Input One is being shut off. Consequently, only the mix of the computer audio stream and the conference audio stream is provided to the transmitting component 106 of the voice audio engine 104, which then provides the mix of the audio streams to the voice conference bridge 118. The voice conference bridge 118 receives and processes the mix of audio streams by canceling the conference audio stream it received from the rest of the conference from the mix of audio streams before transmitting the "cleaned" computer audio to the rest of the conference.

Alternatively, as shown in FIG. 4(*d*), the receiving component 108 of the voice audio engine 104 can provide the conference audio stream it received from the voice conference bridge 118 to the transmitting component 106 of the voice audio engine 104, which then cancels the conference audio stream from the mix of the computer audio stream and conference audio stream, and transmits only the "cleaned" computer audio stream to the voice conference bridge 118, which then provides the computer audio stream to the rest of the conference.

In another alternative embodiment, the switch engine 114 may also switch off or mute the conference audio stream out of the receiving component 108 of the voice audio engine 104 so that the conference audio stream will not be captured and mixed with the computer audio stream by the sound mixing component 112. Switching off the conference audio stream before it is captured by the sound mixing component 112 eliminates the need to cancel the conference audio stream from the mix of audio streams later either by the voice conference bridge 118 or by the transmitting component 106 of the voice audio engine 104.

VoIP Conferencing—Viewer Side

Figure 5:
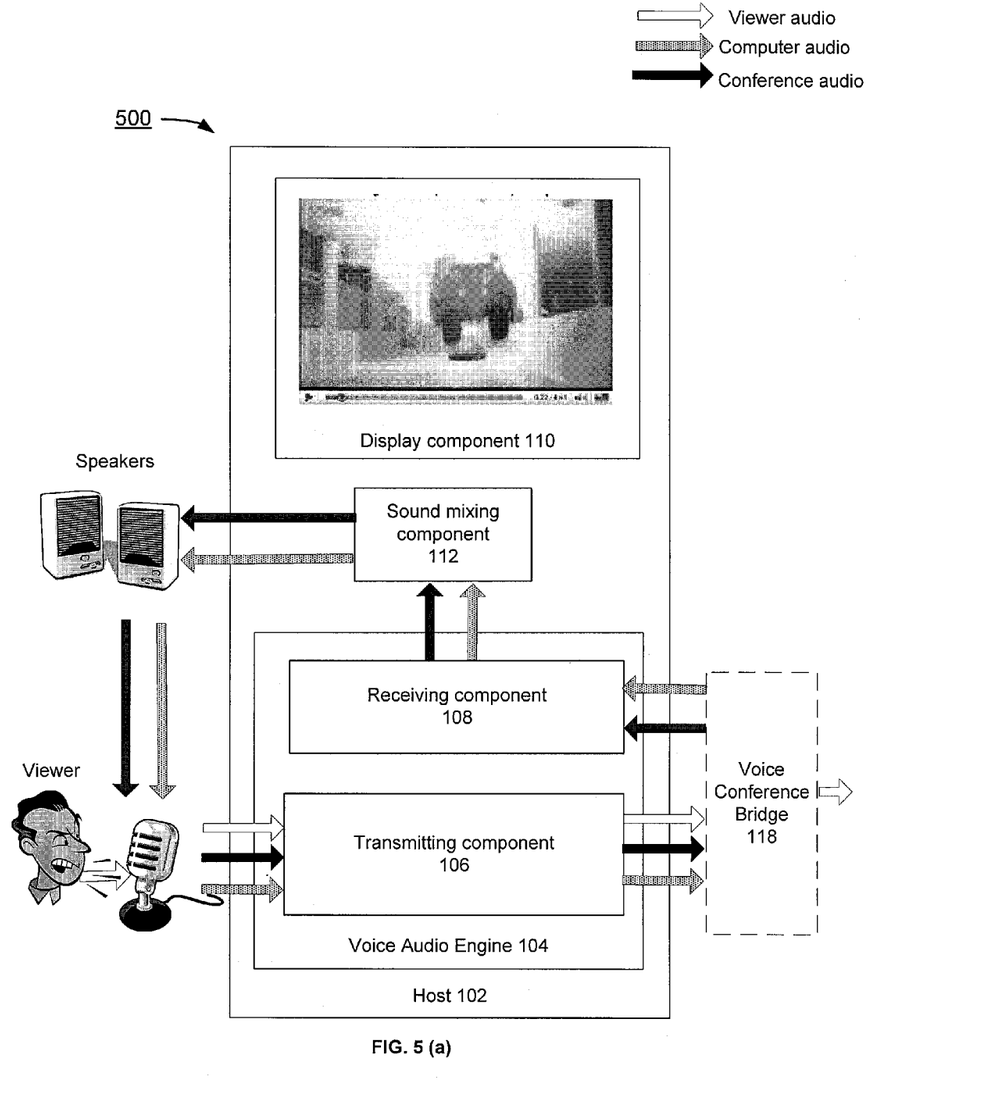
FIGS. 5(a)-(b) depict examples of diagrams of a system on the viewer side of FIG. 1 to support transmitting a clean audio stream for a viewer conferencing through a (VoIP) hosting device.

FIG. 5(*a*) depicts an example of a diagram of a system 500 on the optional viewer side of FIG. 1 to support transmitting a clean audio stream for a viewer conferencing through a (VoIP) hosting device. While the system 500 depicted in FIG. 5(a) is in operation, a mix of audio streams including the computer audio stream and/or the conference audio stream (which may include the presenter audio stream) is transmitted through the voice conference bridge 118 to the receiving component 108 of the voice audio engine 104. The receiving component 108 then accepts and outputs the mix of audio streams to the sound mixing component 112, which then captures and outputs the audio streams to the speaker(s) for the viewer to listen to. The transmitting component 106 of the voice audio engine 104 captures via the microphone not only a voice audio stream of the viewer but also the audio streams played back through the speakers and leaked through the microphone. The transmitting component 106 then provides a mix of the viewer audio stream with the audio streams leaked from the microphone to the voice conference bridge 118 hosting the conference call. The voice conference bridge 118 cancels the computer audio stream and/or the conference audio from the mix of audio streams, and transmits only the viewer audio stream to the rest of the conference.

In an alternative embodiment, as shown by the system 500 depicted in FIG. 5(b), the receiving component 108 of the voice audio engine 104 on the second host 102 can provide the audio streams (including the computer audio stream and/or the conference audio stream) it received from the voice conference bridge 118 to the transmitting component 106 of the voice audio engine 104, which then cancels such audio streams from the audio streams captured by the microphone, and transmits only the "cleaned" viewer audio stream to the voice conference bridge 118, which then provides the viewer audio stream to the rest of the conference.

Figure 6:
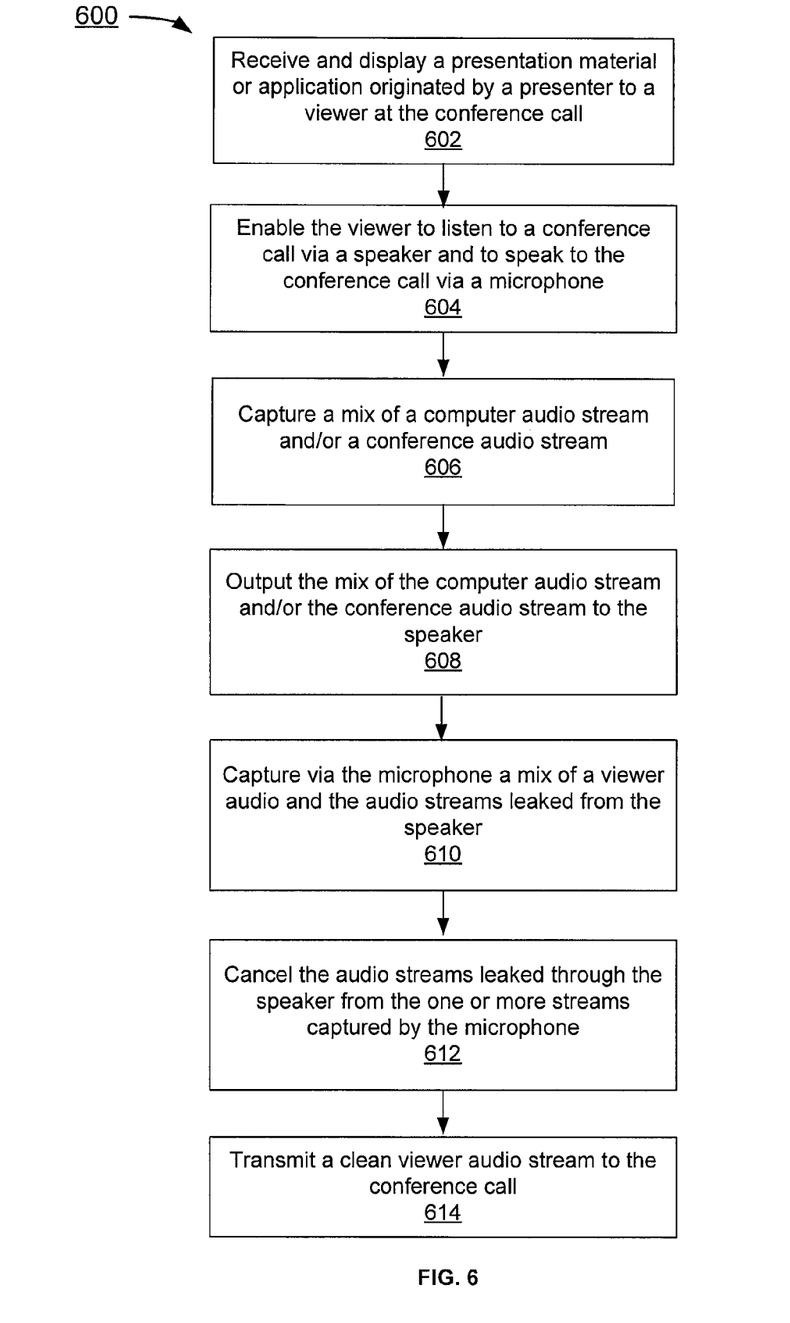
FIG. 6 depicts a flowchart of an example of a process to support transmitting a clean audio stream for a viewer conferencing through a (VoIP) hosting device in accordance with FIGS. 5(a)-(b).

FIG. 6 depicts a flowchart of an example of a process to support transmitting a clean audio stream for a viewer conferencing through a (VoIP) hosting device in accordance with FIGS. 5(a)-(b). In the example of FIG. 6, the flowchart 600 starts at block 602 where a presentation material or an application originated by a presenter is received and optionally displayed to a viewer at the conference call via the hosting device. The flowchart 600 continues to block 604 where the viewer is enabled to participate in the conference call by listening to the conference call via a speaker and speaking to the conference call via a microphone. The flowchart 600 continues to block 606 where a mix of computer audio stream and/or a conference audio stream is received. The flowchart 600 continues to block 608 where either the mix of computer audio streams and/or the conference audio stream is played back via the speaker for the viewer to listen to. The flowchart 600 continues to block 610 where a mix of a viewer audio stream and the audio streams leaked from the speaker are captured via the microphone. The flowchart 600 continues to block 612 where the audio streams leaked through the speaker is canceled from the one or more audio streams captured by the microphone. The flowchart 600 ends at block 614 where a clean viewer audio stream is transmitted to the conference call.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
a first host associated with a presenter, which in operation, runs an application or presents a material;
a first voice audio engine running on the first host, which in operation, accepts a first conference audio stream and transmits either a presenter audio stream from the presenter or a computer audio stream of the application or material to a conference call;
a sound mixing component running on the first host, which in operation, accepts and provides a mix of the first conference audio stream and the computer audio stream of the application or material to a switch engine; the switch engine running on the first host, which in operation, accepts as its two audio inputs the presenter audio stream captured from a microphone associated with the presenter and the mix of the first conference audio stream and the computer audio stream captured from the sound mixing component; wherein the switch engine selects and outputs only one of the two audio inputs as its audio output to the first voice audio engine upon a triggering signal;
a second host associated with a viewer; and
a second voice audio engine running on the second host, which in operation, enables the viewer to listen to the computer audio stream and/or a second conference audio stream including the presenter audio stream and to speak a viewer audio stream at the conference call and transmits the viewer audio stream to the conference call.

2. The system of claim 1, further comprising: a voice conference bridge, which in operation, accepts and transmits the audio streams between the presenter and the viewer at the conference call.

3. The system of claim 1, further comprising:
a first display component of the first host, which in operation enables the presenter to display, manipulate, and share the application or material; and
a second display component of the second host, which in operation receives and displays the application or material originated by the presenter to the viewer at the conference call.

4. The system of claim 1, wherein: each of the first and the second host is a computing device, a communication device, a storage device, or any electronic device capable of running a software component.

5. The system of claim 1, wherein: each of the first and the second voice audio engine enables each of the presenter and the viewer to listen to the conference call via a speaker and enables the presenter to speak to the conference call via the microphone and the viewer to speak to the conference call via a viewer-microphone.

6. A system, comprising:
a host associated with a presenter, which in operation, runs an application or presents a material;
a voice audio engine running on the host, which in operation, accepts a conference audio stream and transmits either a clean presenter audio stream from the presenter or a clean computer audio stream of the application or material to a conference with feedback captured by a microphone associated with the presenter canceled; and
a sound mixing component running on the host, which in operation, accepts and provides a mix of the conference audio stream and the computer audio stream to a switch engine; the switch engine running on the host, which in operation, accepts as its two audio inputs one or more audio streams captured from the microphone and the mix of the conference audio stream and the computer audio stream captured from the sound mixing component; wherein the switch engine selects and outputs only one of the two audio inputs as its audio output to the voice audio engine upon a triggering signal.

7. The system of claim 6, further comprising: a voice conference bridge, which in operation, accepts and transmits audio streams to and from the presenter during the conference.

8. The system of claim 6, wherein: the sound mixing component accepts, mixes, and outputs a mix of the computer audio stream and the conference audio stream to a speaker associated with the host.

9. The system of claim 6, wherein: the one or more audio streams captured from the microphone include one or more of: the presenter audio stream, the computer audio stream, and the conference audio stream.

10. The system of claim 6, wherein: the switch engine enables the presenter to select which one of the two audio inputs to output.

11. The system of claim 6, wherein: the switch engine automatically selects and outputs the presenter audio stream captured from the microphone if it detects that the presenter is talking.

12. The system of claim 11, wherein: the switch engine automatically selects and outputs the audio input of the mix of the conference audio stream and the computer audio stream if it detects that the presenter stops talking.

13. The system of claim 6, wherein: the switch engine automatically selects and outputs the audio input of the mix of the conference audio stream and the computer audio stream if it detects there is an active audio-producing presentation/application.

14. The system of claim 13, wherein: the switch engine automatically selects and outputs the presenter audio stream captured from the microphone if it detects that the audio-producing presentation/application stops being active.

15. The system of claim 6, wherein: the switch engine automatically alerts the presenter and/or asks the presenter whether he/she would like to switch audio inputs if the switch engine detects an active or inactive presenter audio stream or audio-producing presentation/application.

16. The system of claim 6, wherein: the voice audio engine further comprises at least a receiving component, which in operation, accepts and outputs the conference audio stream from the rest of the conference.

17. The system of claim 16, wherein: the switch engine switches off or mutes the conference audio stream out of the receiving component of the voice audio engine.

18. The system of claim 6, wherein: the voice audio engine further comprises at least a transmitting component, which in operation, accepts the mix of the computer audio stream and the conference audio stream; cancels from the one or more audio streams captured from the microphone the mix of the computer audio stream and the conference audio stream; and provides the clean presenter audio stream to the conference.

19. The system of claim 6, wherein: the voice audio engine further comprises at least a transmitting component, which in operation, accepts the conference audio stream; cancels the conference audio stream from the one or more audio streams captured from the microphone; and provides the clean presenter audio stream to the rest of the conference.

20. The system of claim 7, wherein: the voice audio engine further comprises at least a transmitting component, which in operation, captures and provides the mix of the computer audio stream and the conference audio stream to the voice conference bridge, wherein the voice conference bridge cancels the conference audio stream from the mix of the computer audio stream and the conference audio stream and transmits only the computer audio stream to the rest of the conference.

21. The system of claim 6, wherein: the voice audio engine further comprises at least a transmitting component, which in operation, accepts both the conference audio and the mix of the computer audio stream and the conference audio stream; cancels the conference audio stream from the mix of the computer audio stream and the conference audio stream; and provides only the computer audio stream to the rest of the conference.

22. The system of claim 7, further comprising:
a host associated with a viewer; a sound mixing component of the viewer-host, which in operation, accepts and outputs the computer audio stream and/or the conference audio stream of the conference to a speaker; and
a voice audio engine running on the viewer-host, which in operation, captures, mixes, and transmits a viewer audio stream mixed with the computer audio stream and/or conference audio stream leaked from the speaker to the voice conference bridge hosting the conference, wherein the voice conference bridge cancels the computer audio stream and/or conference audio stream from the viewer audio stream mix and transmits a clean viewer audio stream to the conference.

23. The system of claim 6, further comprising:
a host associated with a viewer; a sound mixing component of the viewer-host, which in operation, accepts and outputs the computer audio stream and/or the conference audio of the conference to a speaker; and a voice audio engine running on the viewer-host, which in operation, transmits a clean audio stream of the viewer to the conference with the computer audio stream and/or the conference audio leaked from the speaker canceled.

24. A computer program product comprising a non-transitory computer readable medium having computer readable instructions stored thereon, which, when executed by a processor, causes the processor to implement a computer-implemented method, comprising:

enabling a presenter to run and share an application or a presentation material at a conference call;

enabling the presenter to listen to a viewer audio stream and speak a presenter audio stream at the conference call;

transmitting only one of the presenter audio stream and a computer audio stream of the application or the presentation material to a viewer of the conference call;

receiving either the presenter audio stream or the computer audio stream of the application or the presentation material originated by the presenter by the viewer at the conference call;

enabling the viewer to listen to either the computer audio stream or the presenter audio stream; and transmitting a clean viewer audio stream to the presenter of the conference call.

25. A computer program product comprising a non-transitory computer readable medium having computer readable instructions stored thereon, which, when executed by a processor, causes the processor to implement a computer-implemented method, comprising:

enabling a presenter to run and share an application or a material at a conference call;

enabling the presenter to listen to a conference audio stream and speak a presenter audio stream at the conference call;

accepting and mixing the conference audio stream and a computer audio stream of the application or a material;

capturing one or more audio streams from a microphone associated with the presenter; and selecting, processing, and transmitting only one of a clean presenter audio stream and a clean computer audio stream of the material or application to a viewer of the conference with feedback captured by the microphone canceled.

26. The method of claim 25, further comprising: capturing, mixing, and outputting a mix of the computer audio stream and the conference audio stream to a speaker.

27. The method of claim 25, further comprising: enabling the presenter to select which one of the presenter audio stream and the computer audio stream to output to the rest of the conference.

28. The method of claim 25, further comprising: selecting and outputting the presenter audio stream captured from the microphone automatically if the presenter is detected as talking actively.

29. The method of claim 28, further comprising: selecting and outputting the computer audio stream automatically if the presenter is detected as having stopped talking actively.

30. The method of claim 25, further comprising: selecting and outputting the computer audio stream automatically if an active audio-producing presentation/application is detected.

31. The method of claim 30, further comprising: selecting and outputting the presenter audio stream automatically if the active audio-producing presentation/application is detected as having stopped being active.

32. The method of claim 25, further comprising: alerting the presenter automatically and/or asking the presenter whether he/she would like to switch audio inputs if an active or inactive presenter audio stream or audio-producing presentation/application is detected.

33. The method of claim 25, further comprising: switching off or muting the conference audio stream received from the rest of the conference call.

34. The method of claim 25, further comprising:
accepting a mix of the computer audio stream and the conference audio stream;
canceling from the one or more audio streams captured from the microphone the mix of the computer audio stream and the conference audio stream; and
providing the clean presenter audio stream to the rest of the conference call.

35. The method of claim 25, further comprising:
accepting the conference audio stream;
canceling the conference audio stream from the one or more audio streams captured from the microphone; and
providing the clean presenter audio stream to the rest of the conference call.

36. The method of claim 25, further comprising: capturing and providing the mix of the computer audio stream and the conference audio stream to a voice conference bridge, wherein the voice conference bridge cancels the conference audio stream from the mix of the computer audio stream and the conference audio stream and transmits only the clean computer audio stream to the rest of the conference call.

37. The method of claim 25, further comprising:
accepting both the conference audio stream and the mix of the computer audio stream and the conference audio stream;
canceling the conference audio stream from the mix of the computer audio stream and the conference audio stream; and
providing only the clean computer audio stream to the rest of the conference call.

38. The method of claim 25, further comprising:
receiving and displaying the material or application originated by the presenter to the viewer at the conference call;
enabling the viewer to listen to the conference call via a speaker and to speak to the conference call via a viewer microphone accepting and outputting the computer audio stream and/or the conference audio stream of the conference call to the speaker;
capturing a mix of a viewer audio stream with the computer audio and/or the conference audio stream leaked from the speaker;
canceling the computer audio stream and/or the conference audio stream from the mix of the viewer audio stream with the computer audio and/or the conference audio stream; and
transmitting a clean viewer audio stream to the conference call.

39. The method of claim 25, further comprising:
receiving and displaying the material or application originated by the presenter to the viewer at the conference call;
enabling the viewer to listen to the conference call via a speaker and to speak to the conference call via a viewer microphone accepting and outputting the computer audio stream and/or the conference audio stream to the speaker; and transmitting a clean viewer audio stream to the conference call with the computer audio stream and/or the conference audio stream leaked from the speaker canceled.

40. A non-transitory machine readable medium having software instructions stored thereon that when executed cause a system to:
- enable a presenter to run and share an application or a material at a conference call;
- enable the presenter to listen to a conference audio stream and speak a presenter audio stream at the conference call;
- accept and mix the conference audio stream and a computer audio stream of the application or material;
- capture one or more audio streams from a microphone associated with the presenter; and
- select, process, and transmit only one of a clean presenter audio stream and a clean computer audio stream of the material or application to a viewer of the conference with feedback captured by the microphone canceled.

41. The method of claim 24 wherein the instructions further cause the processor to display the application or the presentation material originated by the presenter to the viewer at the conference call.

42. The method of claim 24 wherein the instructions further cause the processor to enable the viewer to speak a viewer audio stream at the conference call.

* * * * *